United States Patent
Gruber et al.

(10) Patent No.: US 6,847,799 B2
(45) Date of Patent: *Jan. 25, 2005

(54) MISSION CERTIFICATION QUIZ FOR FUNDRAISING CAMPAIGN

(75) Inventors: Harry E. Gruber, Rancho Santa Fe, CA (US); Ephraim Feig, San Diego, CA (US); Julie Schwartz, San Diego, CA (US)

(73) Assignee: Kintera, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/388,824

(22) Filed: Mar. 13, 2003

(65) Prior Publication Data

US 2003/0175674 A1 Sep. 18, 2003

Related U.S. Application Data (63) Continuation of application No. 09/894,190, filed on Jun. 27, 2001.

(51) Int. Cl.[7] .................................................. G09B 5/04
(52) U.S. Cl. ........................................................ 434/350
(58) Field of Search ................................ 434/118, 323, 434/322, 350, 353

(56) References Cited

U.S. PATENT DOCUMENTS

| | | | | |
|---|---|---|---|---|
| 5,879,163 A | * | 3/1999 | Brown et al. | 434/236 |
| 6,064,978 A | * | 5/2000 | Gardner et al. | 705/10 |
| 6,086,381 A | * | 7/2000 | Downs et al. | 434/322 |
| 6,603,955 B2 | * | 8/2003 | Gruber et al. | 434/350 |

* cited by examiner

*Primary Examiner*—Tony M. Argenbright
*Assistant Examiner*—Hyder Ali
(74) *Attorney, Agent, or Firm*—Buchanan Ingersoll P.C.

(57) ABSTRACT

A web-based mission certification quiz for educating various persons involved in a fundraising campaign is disclosed. A web-based method for educating solicitors, donors, participants and others involved in a fundraising campaign about the campaign's mission includes providing, on a website, information about the campaign's mission, taking, on the website, a mission certification quiz by answering one or more questions, wherein the questions are designed to test a participant's knowledge about the campaign's mission. The method further includes determining a final score based on the number of correct answers, and creating a mission certificate on the website based on the final score.

24 Claims, 6 Drawing Sheets

Fig. 1

Mission Quiz thermometer on participants personal donation page for all visitors to see

Fig. 2

The questions are entered when they create their website. They can be multiple choice or true/false questions. There is a 30 second timer to answer question, and the questions have point values.

Fig. 3

In the participant's private log-in area, they can take the mission certification quiz to try and increase their "score". On their tool bar at top, they click on Mission Quiz and this is what they will see.

MISSION CERTIFICATION QUIZ FOR FUNDRAISING CAMPAIGN

This is a continuation of application Ser. No. 09/894,190, filed Jun. 27, 2001

BACKGROUND

1. Field of Invention

The present invention is an interactive, web-enabled method and system for educating solicitors, donors, participants and other persons involved in a fundraising campaign about the campaign's mission. More specifically, the invention is a web-based mission certification quiz to educate various persons involved in a fundraising campaign. The present invention provides a convenient means for educating persons involved in a campaign about the campaign's mission, which can result in increased donations.

2. Related Art

This application is related to a prior application titled "SYSTEM AND METHOD FOR INTERACTIVE FUNDRAISING OVER A WIDE AREA NETWORK", filed Dec. 12, 2000, Attorney Docket No. 0001.US00. The subject matter of the prior application is incorporated herein by reference in its entirety.

3. Description of Prior Art

Charitable, nonprofit and other organizations often raise money through fundraising campaigns. It is necessary that these organizations effectively communicate their fundraising mission to potential donors. It is also important that solicitors that seek donations on behalf of the organizations are well informed about the campaign's mission.

Solicitors who are not well informed about the campaign's mission cannot effectively communicate with potential donors. Solicitors often face many questions from potential donors about the campaign's mission. If solicitors are unable to provide satisfactory answers to the queries, potential donors will be skeptical about the fundraising mission. Also, if solicitors appear to be not well informed about the mission, potential donors may wonder whether the solicitor represents a legitimate charity. An ill-informed solicitor will be less successful in convincing a potential donor to make a contribution. Thus, it is necessary that solicitors and others involved in a fundraising campaign are well informed about the mission and are able to provide satisfactory answers to all queries.

It is also believed that potential donors who are well informed about the campaign's mission are more likely to make a charitable donation. Thus, if potential donors can be efficiently and conveniently educated about the campaign's mission, they can be more influenced to make a donation. Thus, it is desirable to educate potential donors about the campaign's mission.

There are usually no convenient and user-friendly means for educating solicitors, donors and others about a fundraising campaign's mission. For example, there are usually no convenient and user-friendly process to educate participants of charity walks, runs, biking events, and other fundraising events, except for providing literature in the form of handouts and brochures. However, recipients of the handouts are often not motivated to read the information. Also, people often join these events for athletic reasons, and need to be enticed to learn about the charitable cause.

Lack of user-friendly and convenient means for educating about the campaign's mission often results in ill-informed solicitors and donors. It is believed that solicitors will be more successful in fundraising if they are well informed. Also, it is believed that potential donors will be more willing to donate to charitable causes if they are well informed about the mission.

Accordingly, there is a need for a method and system by which nonprofit, charitable and other organizations can effectively communicate their fundraising mission to potential donors. There is a need for a method and system by which such organizations can educate potential donors about various causes that benefit from their support. There is also a need for a method and system that educates solicitors that seek donations on behalf of the organizations about the campaign's mission. There is a need for a method and system that assures potential donors that the solicitors are well informed and represent legitimate organizations.

SUMMARY OF THE INVENTION

The invention is a web-based mission certification quiz for educating various persons involved in a fundraising campaign. In accordance with one embodiment of the invention, a web-based method for educating solicitors, donors, participants and others involved in a fundraising campaign about the campaign's mission, includes providing, on a website, information about the campaign's mission, taking, on the website, a mission certification quiz by answering one or more questions, wherein the questions are designed to test a participant's knowledge about the campaign's mission. The method further includes determining a final score based on the number of correct answers, and creating a mission certificate on the website based on the final score.

In one embodiment, the method includes starting a timer prior to presenting the question, the timer being set for a predetermined amount of time allowed for each question, providing a question, selecting an answer to the question, wherein the answer is selected from one or more answers provided, and if a correct answer is selected before the expiration of the timer, then only awarding a score for each correct answer. The method further includes determining if there are additional questions in the quiz, and if there are additional questions in the quiz, then answering the questions, and if the are no remaining questions in the quiz, then determining a final score, determining a grade on the basis of the final score, and indicating the final score and the grade on the mission certificate. In one embodiment, the invention allows participants to retake the test in order to improve their score. In one embodiment, the method allows a participant to return to a previous question even if he had previously selected an incorrect answer for that question.

The method further includes determining one or more top performers among the plurality of participants of the mission certificate quiz based on the final scores, and acknowledging the top performers. The method further includes determining, if a correct answer is received before the expiration of the timer, the amount of time taken to answer the question. The method further includes awarding prizes or sweepstakes to the top performers.

In one embodiment, teams comprising a plurality of participants may participate in an event organized to raise money for a charitable cause. The participants can take the mission certification quiz, and the teams, rather than individual participants, are ranked based on the scores. The system recognizes the top teams based on the scores. In one embodiment, the system measures the amount of time taken to answer the questions, and recognizes the top performers (individuals and teams) based on the amount of time taken to complete the quiz.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like elements, in which.

DETAILED DESCRIPTION OF THE INVENTION

Turning first to the nomenclature of the specification, the detailed description that follows is represented largely in terms of system block diagrams, processes and symbolic representations by conventional computer components, including a processor associated with a general-purpose computer system, memory storage devices for the processor, and connected display devices. These operations include the manipulation of data bits by the processor and the maintenance of these bits within data structures residing in one or more of the memory storage devices. Such structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purpose of this discussion, a participant refers to a person who selects to take a quiz administered in accordance with the invention. A participant may be engaged in a fundraising campaign to benefit a nonprofit, charitable or other organization. A participant may be a person who is not engaged in the fundraising effort, but nevertheless wishes to take the quiz for fun, pride, prize or to learn about the mission of the fundraising campaign. A participant can be a solicitor or a donor. For the purpose of this discussion, a solicitor refers to a person or an organization soliciting a potential donor or an organization for a charitable donation. The solicitor may be a volunteer, an agent or an employee of a charitable, nonprofit or other organization. The solicitor may be a commercial fundraiser or an agent or employee thereof engaged for the purpose of assisting a charitable or other organization in its fundraising campaign. A donor refers to a person or an organization that makes a charitable donation.

Also for the purpose of this discussion, a process or method is generally conceived to be a sequence of computer-executed steps leading to a desired result. These steps generally require manipulations of physical quantities. Usually, although not necessarily, these quantities take the form of electrical, magnetic, or optical signals capable of being stored, transferred, combined, compared or otherwise manipulated. It is conventional for those skilled in the art to refer to these signals as bits, values, elements, symbols, characters, terms, numbers, records, files or the like. It should be kept in mind, however, that these and some other terms should be associated with appropriate physical quantities for computer operations, and that these terms are merely conventional labels applied to physical quantities that exist within and during operation of the computer.

In addition, it should be understood that the systems and processes described herein are not related or limited to any particular computer, apparatus, or computer language. Rather, various types of general purpose computing machines or devices may be used with programs constructed in accordance with the teachings described herein. Similarly, it may prove advantageous to construct a specialized apparatus to perform the method steps described herein by way of dedicated computer systems with hardwired logic or programs stored in non-volatile memory, such as read-only memory.

The present invention provides a solution to the above-mentioned problems associated with existing fundraising schemes. In one aspect, the invention is an interactive web-enabled method and system for educating solicitors, donors, participants and others involved in a fundraising campaign about the campaign's mission. More specifically, the invention is a mission certification quiz that educates solicitors, donors, participants and others involved in a fundraising campaign about the campaign's mission.

An object of the mission certification quiz is to educate participants of fundraising events to better understand the mission of the charitable, nonprofit and other organizations engaged in the fundraising campaign. Another object of the mission certification quiz is to provide a scoring system on a personal web page to complement a participant's fundraising goal.

It is believed that a well-informed solicitor is more effective in communicating to the potential donors about the campaign's mission. It is also believed that a potential donor who is well informed person about the campaign's mission is more likely to make a charitable donation. According to the invention, a participant accesses one or more web pages to learn about the mission of the fundraising campaign by taking a mission certification quiz. In the preferred embodiment, the participant accesses the system using a personal computer linked to a wide area network such as the Internet. The mission certification quiz allows the participant to learn about the campaign's mission by answering one or more questions included in the quiz. The questions are designed to increase the participant's knowledge and understanding of the campaign's mission.

Consider, for example, a scenario where a fundraising campaign seeks to raise money to support diabetes research. Consider further that the campaign has enrolled one or more solicitors that will solicit donations from potential donors and supporters. In this scenario, it would be desirable if the participants are well informed about diabetes, its consequences, and efforts to find a cure for the disease.

According to the invention, the participants take a mission certification quiz comprising one or more questions related to diabetes. The participants are graded on the basis of the number of correct answers received. At the conclusion the mission certification quiz, the participants' grades are shown in a mission certificate. The mission certificate is a virtual certificate that is placed on a web page. The mission certificate assures a potential donor that the solicitor is well informed and knowledgeable about the mission. The mission certificate also puts pressure on the solicitor to keep retaking the mission certification quiz until he receives a good score.

A participant who is well informed about the campaign's mission is more likely to be able to influence a potential donor to make a donation or to make a larger donation than he would have otherwise. The participant can impress the donor by his mission certificate score that demonstrates his knowledge and understanding about the subject matter. In contrast, an ill-informed participant will be less successful in convincing a potential donor to make a contribution. Potential donors will be hesitant to donate money to a charitable cause when the person seeking the donation is ill-informed about the campaign.

The invention also allows potential donors to take the quiz and conveniently learn more about the campaign or the cause. As potential donors become more informed about the campaign or the cause, they are influenced to make a donation or perhaps make a larger donation. Potential donors can also solicit other friends and family to make donations.

Figure 1:
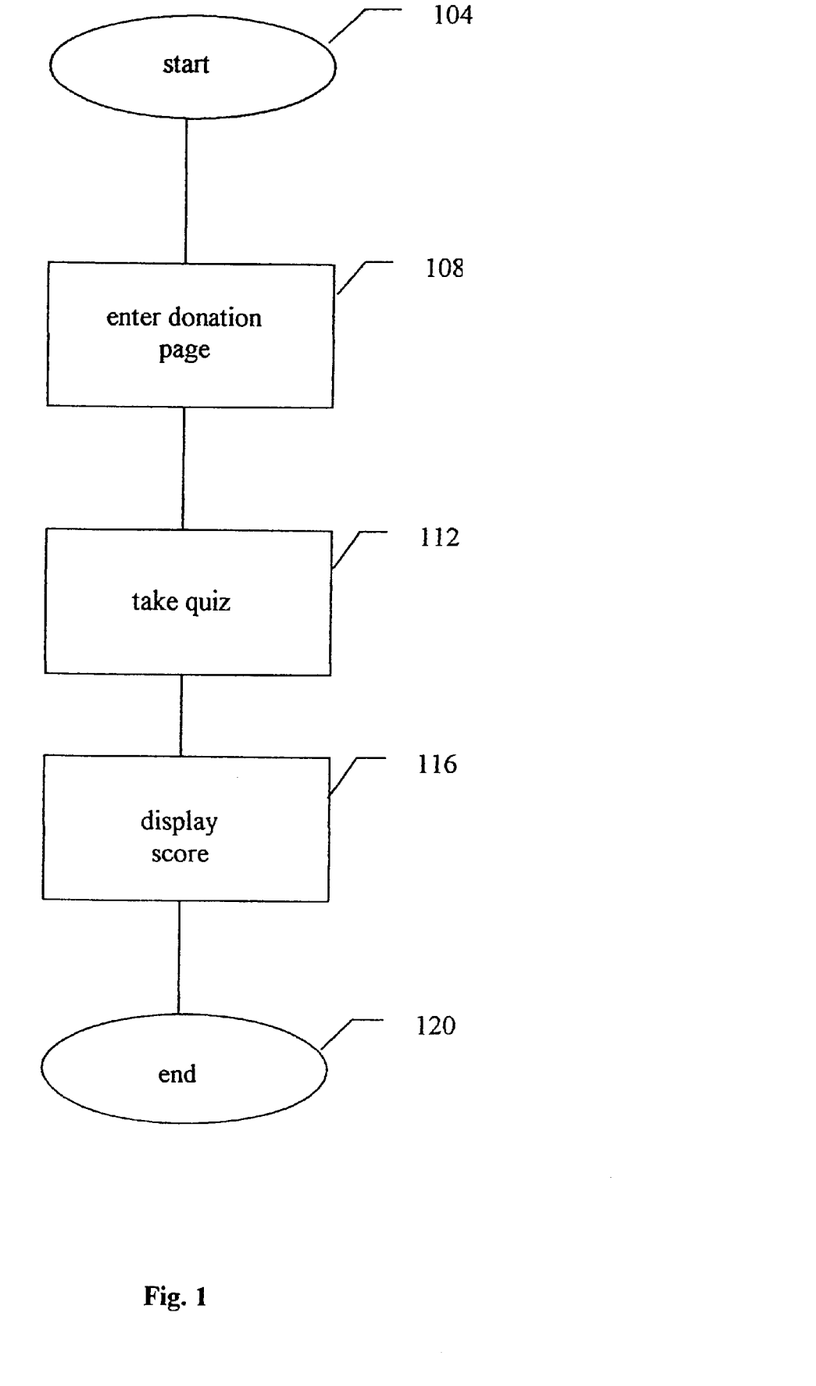
FIG. 1 is a high-level flow diagram illustrating the basic sequence of the method steps of the invention.
Figure 2:
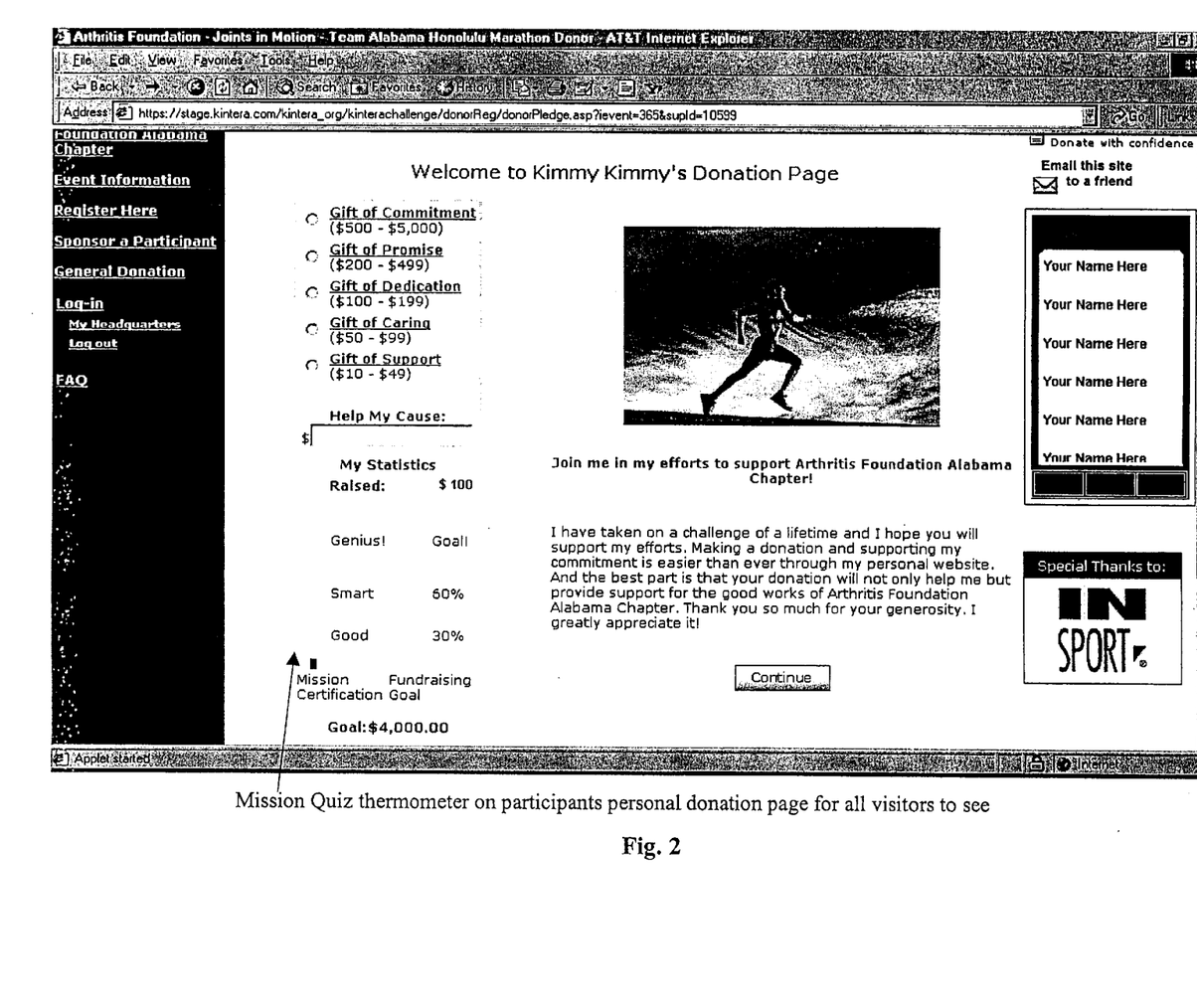
FIG. 2 is an exemplary donation page that includes information about the participant, the fundraising event and a mission certificate.

FIG. 1 is a high-level flow diagram illustrating the basic sequence of the method steps of the invention. The flow starts in step 104 and moves to step 108 where a user enters a personal donation page. An exemplary donation page is shown in FIG. 2 that includes information about the participant, the fundraising event and a mission certificate. The donation page also includes an honor roll recognizing one or more donors, and one or more links to other related sites.

The donation page further includes a convenient means to email a message with a link to the web page or the web page to another person. Thus, the user can inform friends and family about the fundraising campaign via emails and encourage them to participate in the campaign or to make a donation. The donation page further lists various suggested recommended levels of donation and means for a user to make his or her donation.

In one embodiment, a mission certificate includes a score indicating the participant's knowledge about the fundraising mission. The score may include a percentage score and a corresponding grade. For example, in FIG. 2, a 30% score indicates that a participant's knowledge is considered to be good. The participant can retake the quiz and improve his score.

The mission certificate also includes the participant's fundraising goal, i.e., the amount of money the participant intends to raise, and the amount raised. The donation page may include other information, such as, for example, sponsorships or advertisements of other businesses.

Referring back to FIG. 1, the flow moves to step 112, where a user elects to take a quiz. The quiz presents the user with one or more questions related to the fundraising campaign. The quiz can be multiple-choice type or true false type. The questions are designed to test the user's knowledge and familiarity about the mission of the fundraising campaign. In one embodiment, points are awarded for correct answers, and no points are awarded for incorrect answers. In one embodiment, when a participant provides an incorrect answer, the system indicates that the answer is incorrect and then provides the correct answer. Thus, the participant increases his knowledge and understanding about the subject matter by taking the quiz. The system calculates the total score on the basis of the number of correct answers or the percentage of correct answers, and the participant is awarded a grade.

Figure 3:
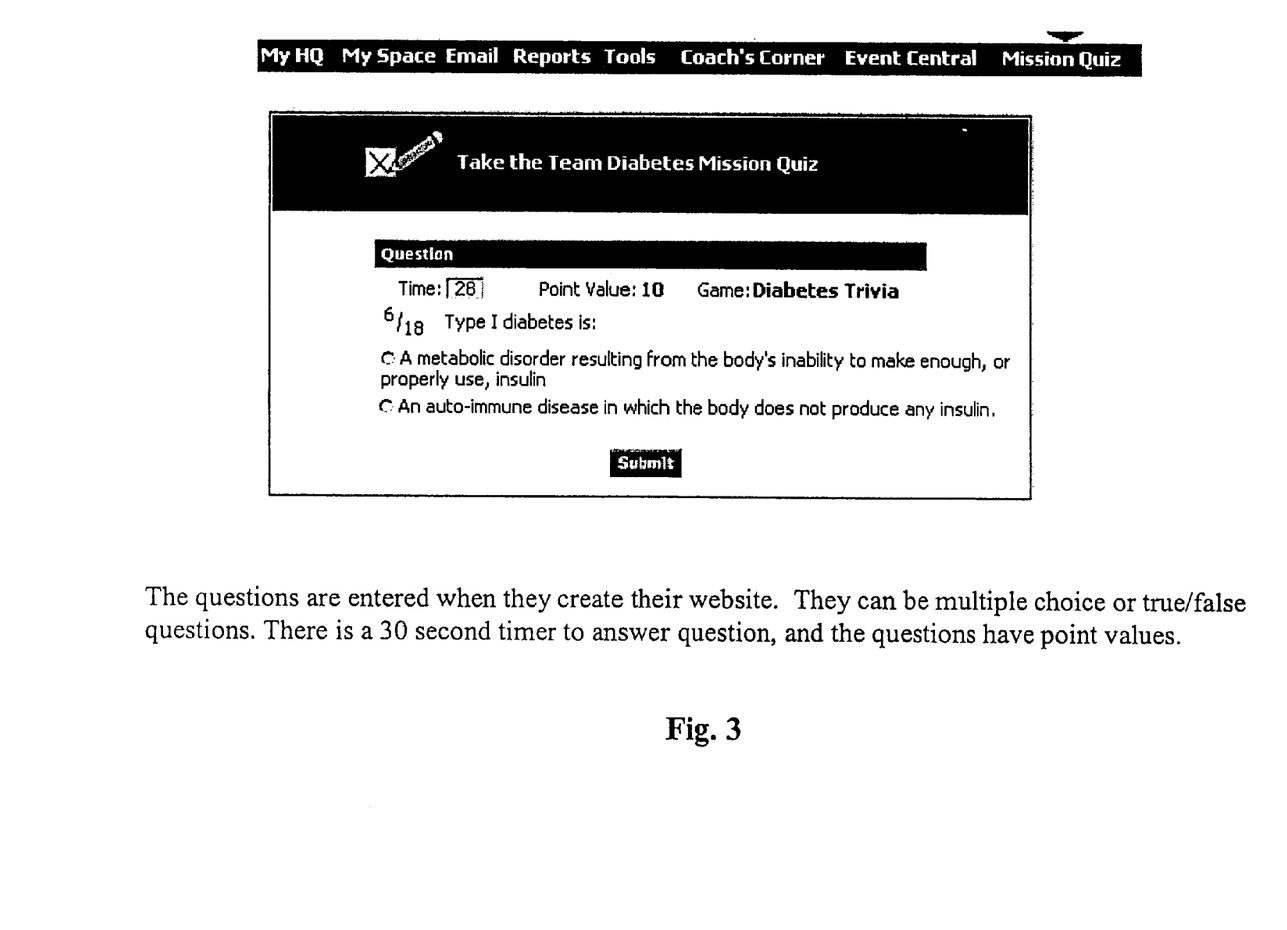
FIG. 3 is an exemplary web page illustrating mission certification quiz.
Figure 4:
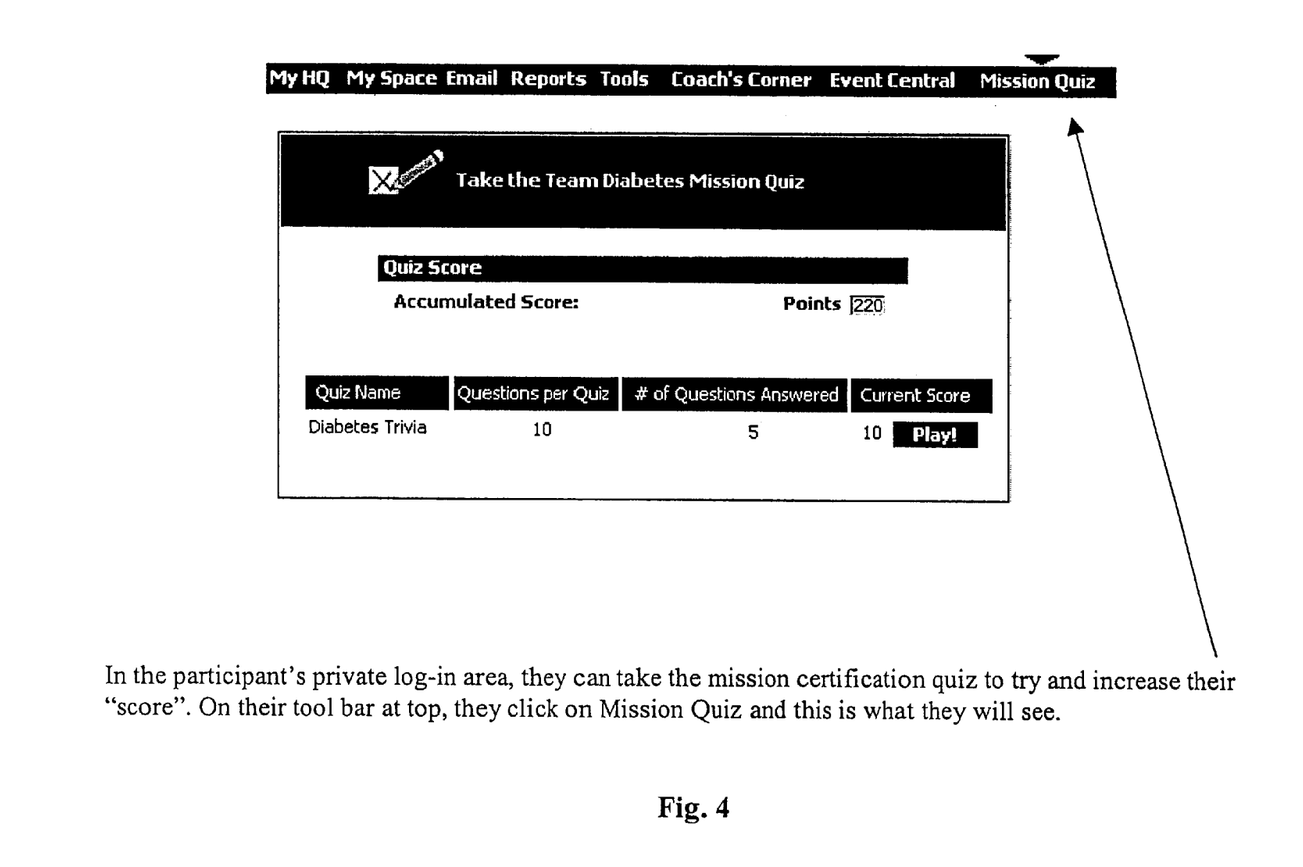
FIG. 4 shows the total number of questions in the quiz, the number of correct answers, and the accumulated score.

FIG. 3 is an exemplary web page illustrating a quiz titled diabetes trivia. The questions presented in the trivia are related to diabetes. The participant selects one of the provided answers, and is awarded a point value for a correct answer. Next, the flow moves to step 116, where the accumulated score is presented. FIG. 4 shows the total number of questions in the quiz, the number of correct answers, and the accumulated score. In one embodiment, the accumulated score is converted to a grade that is shown in the mission certificate. The flow ends at step 120.

Figure 5:
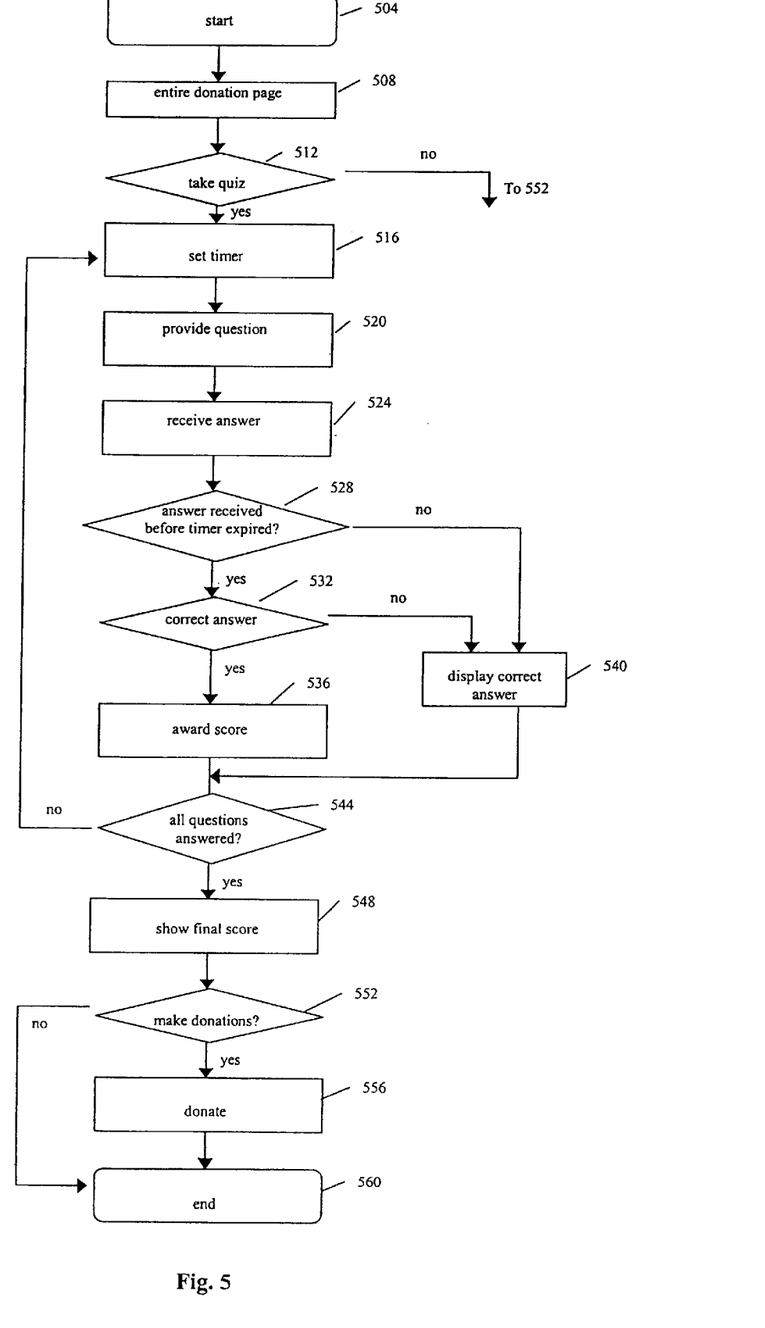
FIG. 5 is a detailed flow diagram of the method steps of the invention.

FIG. 5 is a detailed flow diagram of the method steps of the invention. The flow starts in step 504 and moves to step 508, where a participant enters the donation page. The donation page has been described in detail before. Next, the flow moves to step 512, where the participant decides whether to take a quiz. If the participant decides to take the quiz, the flow moves to step 516, where a timer is set. In one embodiment, the timer sets a predetermined time period within which the participant must answer each question.

Next, the flow moves to step 520, where a question is presented. In step 524, an answer is received from the participant. The quiz may be a multiple-choice type or a true-false type. In step 528, the system determines if the answer was received within the allowed time period. If the answer was received within the allowed time period, the flow moves to step 532, where it is determined if the answer was correct.

Referring back to FIG. 3, the timer indicates that the participant has 28 seconds remaining to answer a particular question. In one embodiment, if the participant does not answer the question within the predetermined time period, then it is counted as an incorrect answer.

If the answer is correct, the flow moves to step 536, where the participant is awarded a predetermined score. The system indicates that the answer is correct and the accumulated score goes up. If the answer is incorrect, no score is awarded and the system indicates the answer is incorrect, and the flow moves to step 540 where the correct answer is shown.

In step 544, the system checks if the participant has answered all questions in the quiz. If there are remaining questions in the quiz, the flow returns to step 516 and the timer is reset. If there are no remaining questions in the quiz, a final score is displayed in step 548. In step 552, the participant is asked whether he wants to make a donation. If the participant wants to make a donation, then in step 556, he makes a donation. The flow ends in step 560.

In one embodiment, the system keeps track of the participants' score and identifies the top performers or top teams. For example, the system can identify the top five performers (or top five teams) based on their score and acknowledge them on a virtual plaque. The top performers can be awarded prizes or other gifts. Such acknowledgement motivates participants to learn more about the mission and increases the overall knowledge of all participants. This increases the effectiveness of the participants as they solicit donations.

In one embodiment, the system measures the time taken by the participants to answer the questions. More specifically, the timer keeps track of the time taken to correctly answer each questions. If two or more performers have same equal score, the system can identify the top performer based on the amount of time taken to answer a particular question. Consider, for example, that two participants have identical scores in the quiz and have each answered a particular question correctly. The system then identifies the participant that took less time to answer the question and that participant is considered to be the higher performer. In one embodiment, the system provides tie-breaker questions to two or more participants or teams until a winning participant or team is found.

The invention motivates the participants (individuals or teams) to excel in the mission certification quiz because the top performers are acknowledged on the mission certificate. Furthermore participants are motivated to excel in the quiz because a high score in the quiz will impress a potential donor, which may result in more donation for the campaign. Others are motivated to take the quiz because it provides entertainment and is a convenient way to enhance their knowledge of the subject matter. In one embodiment, the invention allows participants to generate questions for the mission certification quiz.

The invention can easily be adapted and used in live events on television or other media, such as the Internet or the radio. The live events can be held as part of a fundraising campaign.

Figure 6:
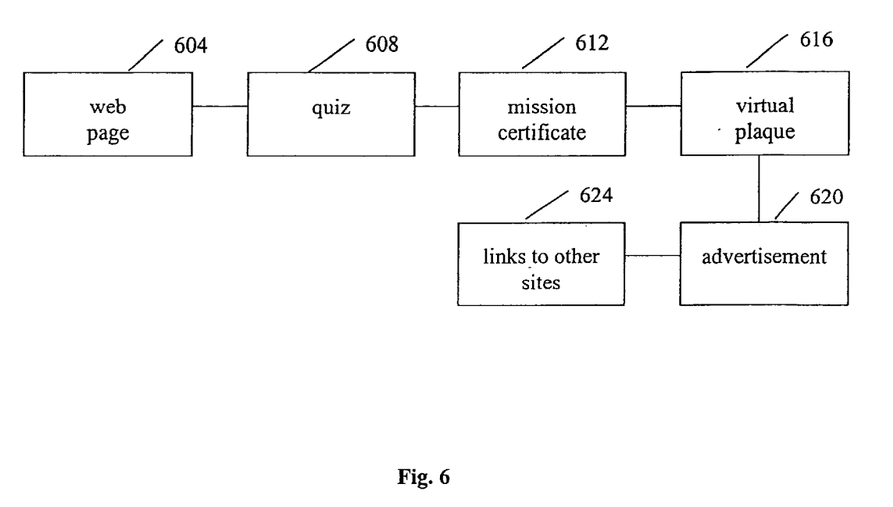
FIG. 6 is a system level diagram comprising one or more web pages 604.

In one aspect, the invention is a system comprising a plurality of elements. FIG. 6 is a system level diagram comprising one or more web pages 604. One of the web pages can be a personal donation page of a participant taking part in a fundraising campaign. The web page includes information about the fundraising campaign. The web page can belong to an organization engaged in a fundraising drive.

The system also includes a quiz 608. The quiz provides one or more questions designed to test the knowledge of the participant about the mission of the campaign. The quiz provides a plurality of answers for each question, and the participant is asked to select the correct answer. The participant receives a score for a correct answer. At the completion of the quiz, the final score is calculated. It should be understood that the elements of FIG. 6 can be incorporated into a single web page or into a plurality of web pages.

The system also includes a mission certificate 612 that displays a final score and a grade. The final score is determined on the basis of the number of questions answered correctly. The mission certificate is described in detail before. The system also includes one or more virtual plaques 616 that honor top performers of the mission certification quiz. The web page includes commercial sponsorships or advertisements 620 and links 624 to other sites.

In one embodiment, the program code for carrying out the steps in accordance with the present invention can be stored in a storage medium and made available for sale as a software program or a computer program product. For example, the program code can be stored in a compact disk (CD), a magnetic tape, or any other type of storage medium. A manufacturer can make the software program available for sale so that individuals and business entities may purchase or otherwise obtain the software program to set up an automated, on-line donation processing system.

Although the preferred embodiments have been described, it should be understood that various changes, substitutions, and alterations can be made herein without departing from the scope of the present invention. For example, although the present invention has been described and illustrated primarily in relation to Internet applications, it should be understood that the present invention is in no way limited to only the Internet and may be implemented on other networks also. Furthermore, it should be noted that the present invention can be implemented using virtually any computer system or other networking system and virtually any available programming language. Thus the implementation of the present invention is not limited to the computer network illustrated in this document. Other examples of changes, substitutions, and alterations are readily ascertainable by one skilled in the art and could be made without departing from the spirit and scope of the present invention as defined by the following claims.

What is claimed is:

1. A web-based method for educating solicitors, donors, participants and others involved in a fundraising campaign about the campaign's mission, the method using an online quiz to entertain and educate the persons involved in the campaign, comprising:

taking, on the website, a mission certification quiz by answering one or more questions, wherein the questions are designed to test a participant's knowledge about the campaign's mission;

determining a final score based on the number of correct answers; and creating a mission certificate on the website based on the final score, identifying top performers based on their score;

listing the top performers on a virtual plaque;

listing the number of questions correctly answered and the total score on the mission certificate on the website;

wherein the method motivates the persons involved in the campaign to learn about the mission by the mission certificate.

2. The method according to claim 1, further comprising:

starting a timer prior to presenting the question, the timer being set for a predetermined amount of time allowed for each question;

providing a question;

selecting an answer to the question, wherein the answer is selected from one or more answers provided; and if a correct answer is selected before the expiration of the timer, then only awarding a score for each correct answer.

3. The method according to claim 2, further comprising:

determining if there are additional questions in the quiz;

if there are additional questions in the quiz, then answering the questions;

if the are no remaining questions in the quiz, then determining a final score; determining a grade on the basis of the final score; and indicating the final score and the grade on the mission certificate.

4. The method according to claim 3, further comprising:

determining one or more top performers among the plurality of participants of the mission certification quiz based on the final scores; and acknowledging the top performers on a virtual plaque.

5. The method according to claim 3, further comprising determining one or more top performers of the mission certification quiz based on the amount of time taken to complete the quiz.

6. The method according to claim 3, further comprising determining one or more top performers of the mission certification quiz based on the points awarded in the quiz.

7. The method according to claim 3, further comprising awarding one or more prizes to the top performers.

8. The method according to claim 4, further comprising determining, if a correct answer is received before the expiration of the timer, the amount of time taken to answer the question.

9. The method according to claim 5, further comprising determining the top performers based on the least amount of time taken to answer the questions correctly.

10. The method according to claim 3, further comprising:
asking if the participant wants to make a charitable donation; and
receiving a charitable donation.

11. The method according to claim 7, wherein the top performers are individual participants.

12. The method according to claim 7, wherein the top performers are the top teams.

13. The method according to claim 1, further comprising allowing participants to generate questions for the quiz.

14. A web-based system having a mission certification quiz for educating solicitors, donors, participants and others involved in a fundraising campaign about the campaign's mission, the system using an online quiz to entertain and educate the persons involved in the campaign, comprising:
means for providing one or more questions on the website, wherein the questions are designed to test a participant's knowledge about the campaign's mission;
means for selecting one or more answers on the website, wherein an answer is selected from the one or more answers provided;
means for determining a final score based on the number of correct answers;
a mission certificate on the website based on the final score;
means for identifying top performers based on their score;
means for listing the top performers on a virtual plaque;
means for listing the number of questions correctly answered and the total score on the mission certificate on the website.

15. The system according to claim 14, further comprising:
a timer set for a predetermined amount of time allowed for each question; and
a score awarded only if a correct answer is received before the expiration of the timer.

16. The system according to claim 14, further comprising:
means for providing additional questions in the quiz;
means for selecting one or more answers to the questions;
means for determining a final score based on the accumulated score;
means for determining a grade on the basis of the final score; and
a mission certificate for indicating the final score and the grade.

17. The system according to claim 16, further comprising:
means for determining one or more top performers among the plurality of participants of the mission certificate quiz based on the final scores; and
one or more virtual plaques for acknowledging the top performers.

18. The system according to claim 17, wherein top performers are individual participants.

19. The system according to claim 17, wherein the top performers are the top teams.

20. The system according to claim 14, wherein the participants generate questions for the quiz.

21. A computer-readable medium having computer executable instructions for performing a web-based method for educating solicitors, donors, participants and others involved in a fundraising campaign about the campaign's mission, the method using an online quiz to entertain and educate the persons involved in the campaign, comprising:
taking, on the website, a mission certification quiz by answering one or more questions, wherein the questions are designed to test a participant's knowledge about the campaign's mission; and
determining a final score based on the number of correct answers; and creating a mission certificate on the website based on the final score,
wherein the method motivates the persons involved in the campaign to learn about the mission by the mission certificate;
identifying top performers based on their score;
listing the top performers on a virtual plaque;
listing the number of question correctly answered and the total score on the mission certificate on the website.

22. The computer-readable medium for performing the web-based method according to claim 21, further comprising:
starting a timer prior to presenting the question, the timer being set for a predetermined amount of time allowed for each question;
providing a question;
selecting an answer to the question, wherein the answer is selected from one or more answers provided; and
if a correct answer is selected before the expiration of the timer, then only awarding a score for each correct answer.

23. The computer-readable medium for performing the web-based method according to claim 22, further comprising:
determining if there are additional questions in the quiz;
if there are additional questions in the quiz, then answering the questions;
if the are no remaining questions in the quiz, then determining a final score; determining a grade on the basis of the final score; and
indicating the final score and the grade on the mission certificate.

24. The computer-readable medium for performing the web-based method according to claim 21, further comprising:
determining one or more top performers among the plurality of participants of the mission certificate quiz based on the final scores; and
acknowledging the top performers on a virtual plaque.

* * * * *